(No Model.)　　　　　　　　　　　　　　　　　2 Sheets—Sheet 1.
H. SCHAFFSTÄDT.
DOUBLE VALVE INLET.

No. 584,122.　　　　　　　　　Patented June 8, 1897.

WITNESSES:

INVENTOR:
Heinrich Schaffstädt.
BY
ATTORNEY.

(No Model.) 2 Sheets—Sheet 2.

H. SCHAFFSTÄDT.
DOUBLE VALVE INLET.

No. 584,122. Patented June 8, 1897.

WITNESSES:
Gw A Eisenbraun;
Eugenie A. Pirsides.

INVENTOR:
Heinrich Schaffstädt
BY A Faber du Faur
ATTORNEY.

UNITED STATES PATENT OFFICE.

HEINRICH SCHAFFSTADT, OF GIESSEN, GERMANY.

DOUBLE-VALVE INLET.

SPECIFICATION forming part of Letters Patent No. 584,122, dated June 8, 1897.

Application filed December 18, 1895. Serial No. 572,519. (No model.)

*To all whom it may concern:*

Be it known that I, HEINRICH SCHAFFSTÄDT, manufacturer, of Giessen, in the Grand Duchy of Hessen, Germany, have invented new and useful Improvements in Double-Valve Inlets, of which the following is a specification.

My invention has reference to improvements in mixing-valves especially adapted for bath-tubs, and has for its object to prevent injury by the steam or hot water while allowing steam or hot water and cold water to be mixed in any desired proportion before leaving the valve-nozzle.

The nature of my invention will best be understood when described in connection with the accompanying drawings, in which—

Figure 1:
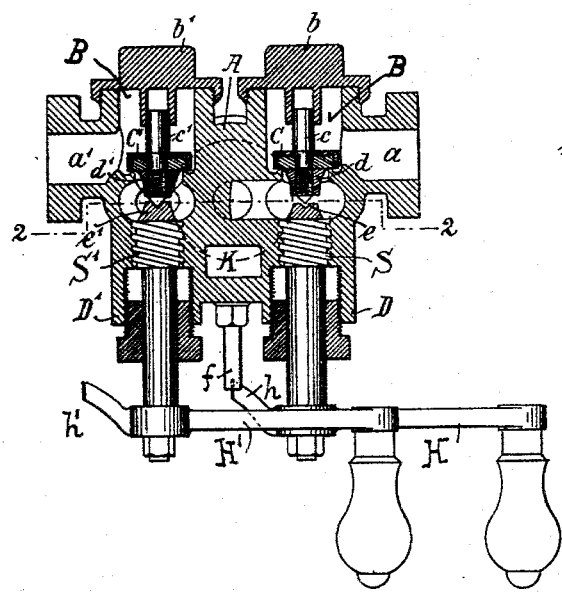
Figure 2:
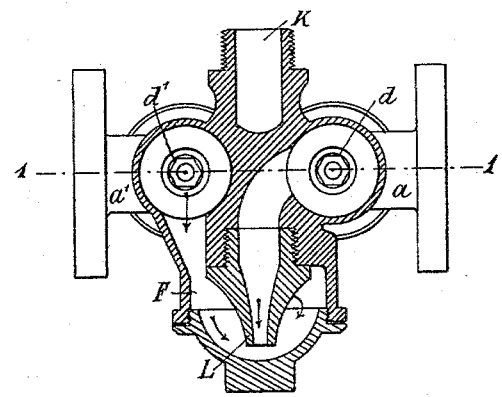
Figure 3:
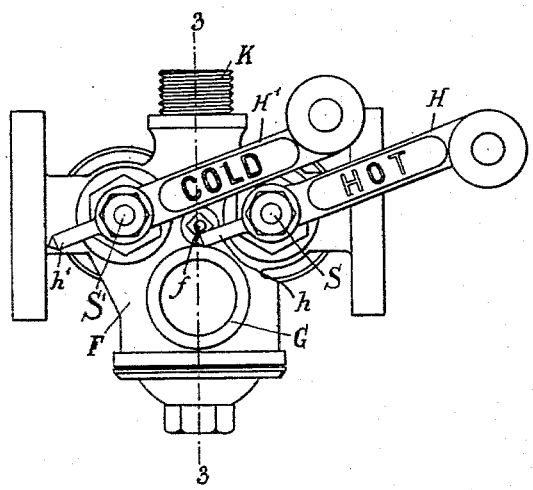
Figure 4:
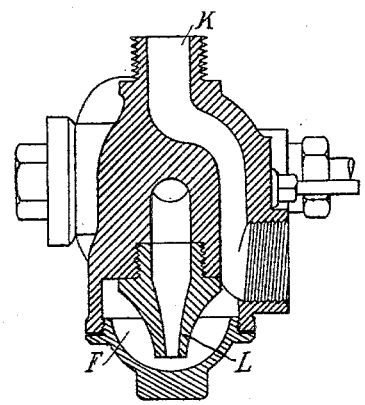
Figure 5:
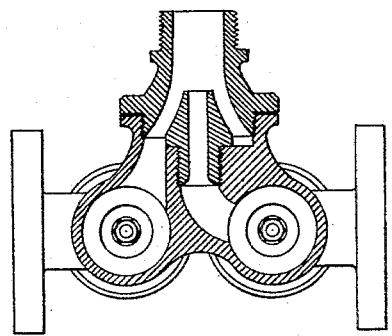
Figure 6:
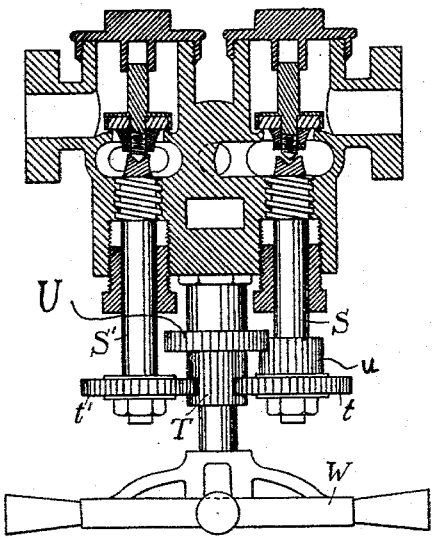
Figure 7:
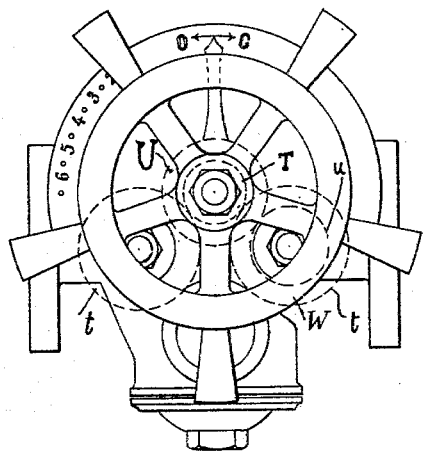

Figure 1 represents a section on the line 1 1, Fig. 2. Fig. 2 is a section on the line 2 2, Fig. 1. Fig. 3 is a front view. Fig. 4 is a section on the line 3 3, Fig. 3. Figs. 5, 6, and 7 illustrate modified forms.

Similar letters of reference designate corresponding parts throughout the several views of the drawings.

Referring at present to Figs. 1 to 4 of the drawings, the letter A designates a valve-casing provided on one side with an inlet $a$ for steam and on the opposite side with an inlet $a'$ for water and with intermediate valve-chambers B B', with which said inlets respectively communicate. The valve-chambers are closed at one end by suitable screw-caps $b\ b'$ and are provided with seats for valves C C', provided with stems $c\ c'$, guided in suitable sockets in the screw-caps $b\ b'$. Beyond the valve-seats are located guide-pieces $d\ d'$, provided with radial grooves permitting the passage of steam or water, respectively. The valves are held to their seats by the pressure of the steam and water; but, if desired, suitable springs may also be used for that purpose. In line with the valves C C' and guided in suitable glands D D' are disposed threaded valve-spindles S S'. In each spindle is formed a conical seat $e\ e'$, which receive the pointed ends of the valve-stems $c\ c'$. The valve-spindles are so set that when the valves C C' are down upon their seats and the valve-spindles in their normal positions the seat $e'$ of the cold-water spindle is in close contact with the valve-stem $c'$ of the cold-water valve C', whereas some play is allowed between the steam-spindle S and the stem of the steam-valve C. To the valve-spindles S S' are attached two hand-levers H H', as shown in Figs. 1 and 3. In the normal positions of the valve-spindles and hand-levers, as shown in Fig. 3, a tappet $h$ on the lever H rests against a stop $f$, affixed to the valve-casing A. If the hot-water lever H is turned and consequently moved outwardly, it engages with the cold-water lever H' and simultaneously turns the same, thereby lifting the valve C' from its seat and admitting a quantity of cold water to the valve-chamber B'. After this the spindle S engages with the valve C and opens the same to admit steam or hot water to the valve-chamber B. It will readily be understood that the cold-water lever can be turned on to a greater extent than the hot-water lever, as it leads the same, and consequently the temperature of the outstreaming water can be regulated by said lever. The cold-water lever may also be provided with a tappet $h'$, adapted to limit its motion by engaging with the stop $f$. For mixing the steam or hot water and cold water the casing A is provided with a mixing-chamber F, which opens at one side into the portion of the valve-chamber below the cold-water valve C' and communicates at the front side with the common outlet-nozzle G. From this chamber may also lead a passage K, communicating with the pipe leading to the usual rose. The steam or hot water from the valve-chamber B is conducted centrally downward and discharged into the mixing-chamber through a nozzle L. It will therefore be understood that the steam or hot water passing to the mixing-chamber is surrounded by the cold water. In practice I prefer to make the grooves in the guide-piece $d'$ of such shape as to allow the same flow of water in every position of the valve, while the guide-piece $d$ is so shaped as to permit of an increased outflow of steam or hot water when the valve is raised farther from its seat.

In the modification illustrated in Figs. 5, 6, and 7 I have shown a construction adapted to secure a more accurate mixing of the fluids by providing an improved construction in the means for rotating the valve-spindles S S'. According to this construction I mount a pinion T on the spindle of the operating handwheel W, which pinion engages with two gears $t\ t'$, secured to the spindles S S'. A gear $u$, placed on either of the valve-spindles S S', meshes with the larger gear U, connected with a pointer placed opposite the scale to show the proportion of hot and cold water.

What I claim as new is—

1. In a mixing-valve, the combination of two valves guided to move toward and from their seats, two screw-spindles arranged in line with said valves and adapted to engage with the latter to lift the same from their seats, and an operative connection between the valve-spindles whereby the same are caused to successively operate the valves, from a predetermined normal position of said spindles, substantially as described.

2. In a mixing-valve, the combination of two valves guided to move toward and from their seats, two screw-spindles arranged in line with said valves and adapted to engage with the latter to lift the same from their seats, hand-levers in connection with said screw-spindles, and means for rotating the cold-water lever by the motion of the hot-water lever and for opening the cold-water valve in advance of the hot-water or steam valve, substantially as described.

3. In a mixing-valve, the combination of two valves for cold and hot water or steam, two screw-spindles adapted to push or lift the valves, and hand-levers affixed to said spindles and placed in the same plane; the hot-water lever being adapted to engage with the cold-water lever when moved, substantially as described.

4. In a mixing-valve, the combination of two guided valves for cold and hot water or steam respectively, two screw-spindles adapted to push or lift the valves from their seats and provided with seats for the ends of the valve-stems, and an operative connection between the valve-spindles whereby the same are caused to successively operate the valves, substantially as described.

5. In a mixing-valve, the combination of two valves guided to move toward and from their seats, two screw-spindles adapted to push or lift the valves from their seats and provided with seats for the ends of the valve-stems; said spindles being arranged to act in succession upon the valves, and handles attached to said spindles and disposed to be operated one by the other, substantially as and for the purpose specified.

6. In a mixing-valve, the combination of two guided valves for cold and hot water or steam, two screw-threaded spindles for operating said valves, a mixing-chamber, a nozzle leading from the steam or hot-water chamber to said mixing-chamber, and a surrounding passage for cold water communicating with the mixing-chamber, substantially as and for the purpose set forth.

In testimony whereof I have signed my name to this specification in the presence of two subscribing witnesses.

HEINRICH SCHAFFSTÄDT.

Witnesses:
RICHARD WIRTH,
CARL ROTH.